Feb. 15, 1955  M. KLIMEK, JR  2,702,088
SNOWMOBILE
Filed Aug. 31, 1951  2 Sheets-Sheet 1
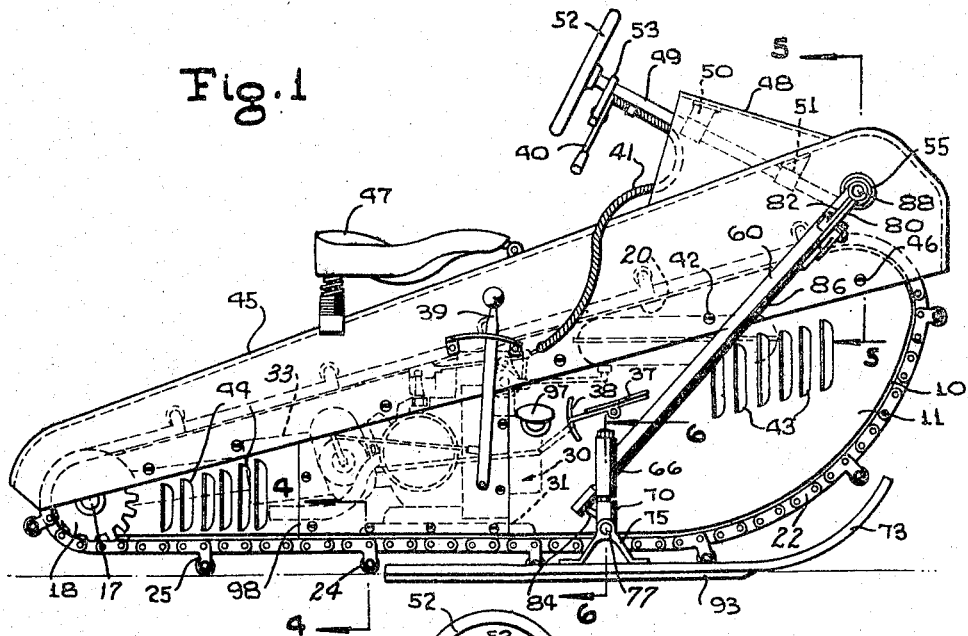
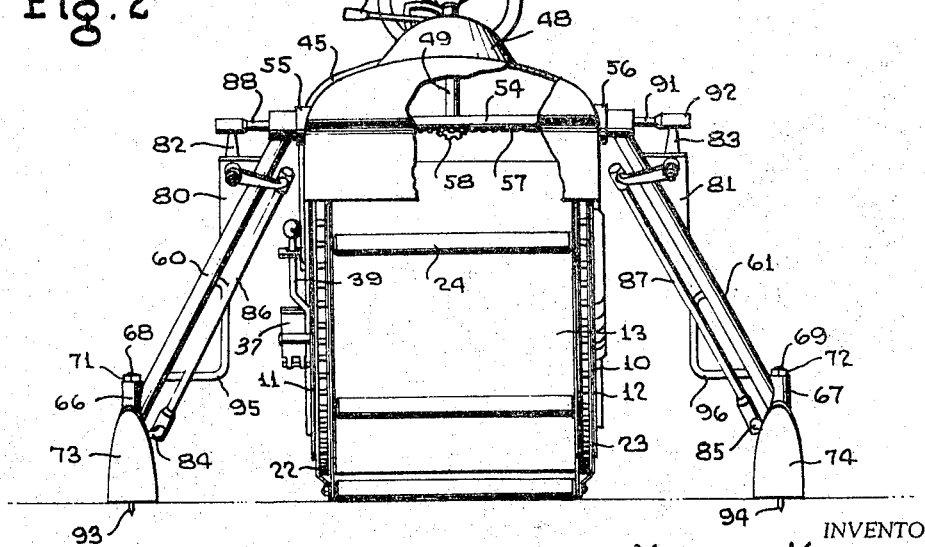
INVENTOR
MARCEL KLIMEK, Jr.
BY
McMorrow, Berman & Davidson
ATTORNEYS Feb. 15, 1955  M. KLIMEK, JR  2,702,088
SNOWMOBILE
Filed Aug. 31, 1951  2 Sheets-Sheet 2
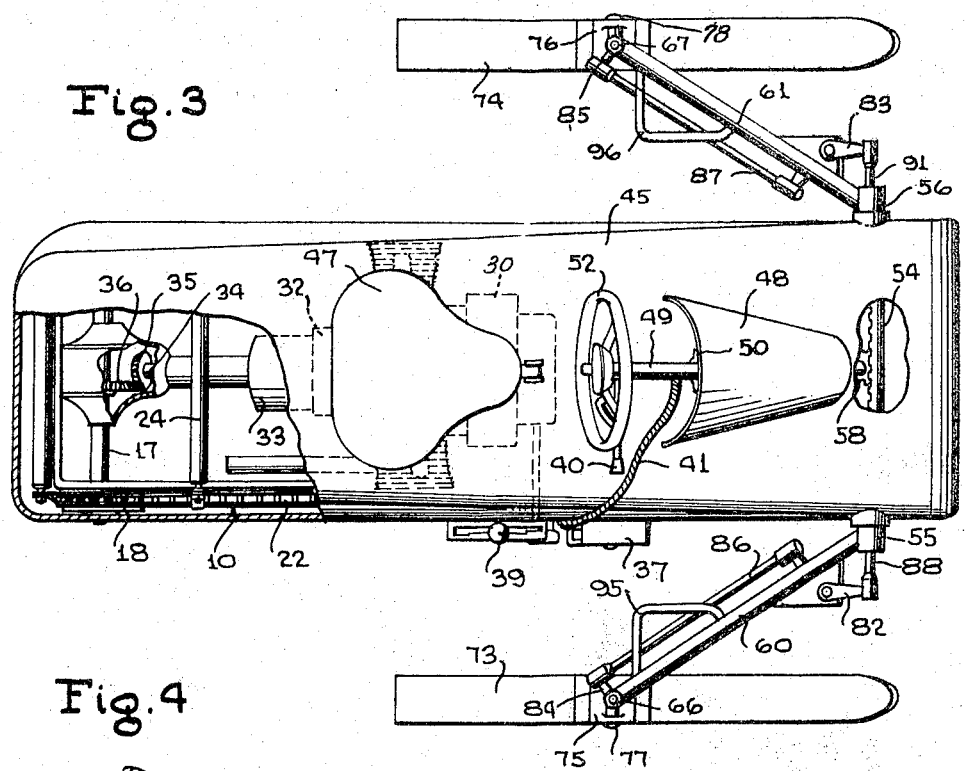
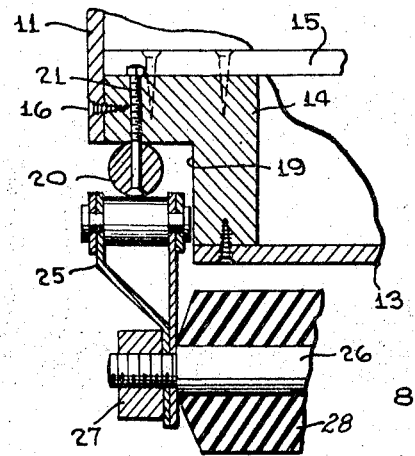
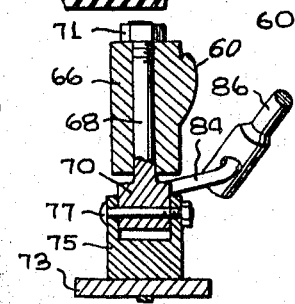
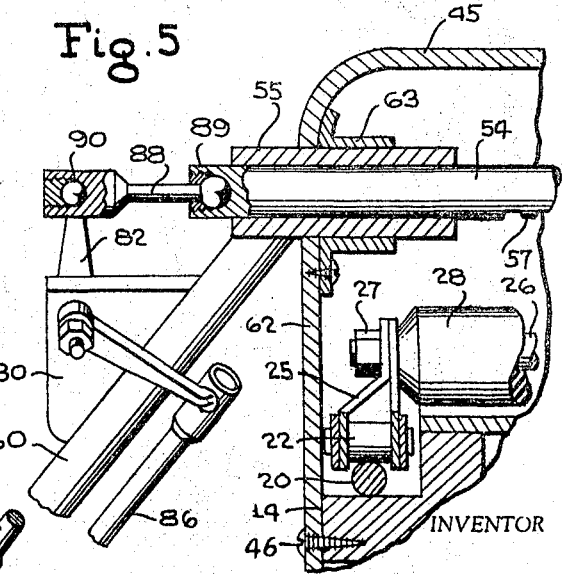
INVENTOR
MARCEL KLIMEK, Jr.
BY
McMorrow, Berman & Davidson
ATTORNEYS

United States Patent Office 2,702,088
Patented Feb. 15, 1955

2,702,088

SNOWMOBILE

Marcel Klimek, Jr., Talent, Oreg.

Application August 31, 1951, Serial No. 244,489

3 Claims. (Cl. 180—5)

This invention relates to snowmobiles and more particularly to an automotive vehicle adapted to travel on snow and carry a rider in an astride position.

It is among the objects of the invention to provide an improved automotive vehicle for traveling on snow or a snowmobile which carries a rider in an astride position and is power driven to travel at high speed; which includes a body containing a power plant and carrying an endless track driven by the power plant, and outrigger skis disposed one at each side of the body and steerable from the latter; which includes means connecting the skis to the body for up and down movement of the skis relative to the body, so that the rider can hold the body in upright position or cause it to bank on curves and which also connects the skis to the body for longitudinal rocking movement of the skis to facilitate their passage over obstructions; which is of streamline shape so that it can pass through deep snow without material obstruction by the snow and will tend to ride upon the snow regardless of the depth thereof; which is of light weight and easy to control; and which is simple and durable in construction, economical to manufacture, efficient and effective in use, and neat and attractive in appearance.

Other objects and advantages will become apparent from a consideration of the following description and the appended claims in conjunction with the accompanying drawings wherein:

Figure 1 is a side elevational view of a snowmobile illustrative of the invention;

Figure 2 is a front elevational view of the snowmobile illustrated in Figure 1, a portion being broken away and shown in cross section to better illustrate the construction thereof;

Figure 3 is a top plan view of the snowmobile, a portion being broken away and shown in cross section to better illustrate the construction thereof;

Figure 4 is a fragmentary cross sectional view on an enlarged scale on the line 4—4 of Figure 1;

Figure 5 is a fragmentary cross sectional view on an enlarged scale on the line 5—5 of Figure 1; and Figure 6 is a fragmentary cross sectional view on an enlarged scale on the line 6—6 of Figure 1.

With continued reference to the drawings, the numeral 10 generally designates a hollow body having flat side walls 11 and 12 disposed in spaced apart and substantially parallel relationship to each other and a continuous top, bottom and end wall 13 extending around and secured to the edges of the side walls. The body is substantially flat along its top and bottom surfaces and is tapered from its front to its rear end, so that its front end is materially thicker or higher than its rear end. The rear end of the body is arcuately curved through approximately 180 degrees and the front end of the body is curved upwardly and forwardly from the front end of the bottom surface thereof and downwardly and forwardly from the front end of the top surface, the curvature extending upwardly and forwardly from the front end of the bottom surface having a radius materially larger than the curvature extending forwardly and downwardly from the front end of the top surface, so that the body has in side elevation a shape somewhat resembling an inverted airfoil section, as is clearly illustrated in Figure 1.

The body includes frame members, as indicated at 14 in Figures 4 and 5, extending marginally around the side walls 11 and 12 and joined together in spaced apart and substantially parallel relationship by suitable transversely extending frame members, as indicated at 15 in Figure 4.

The side walls 11 and 12 and the combined top, bottom and end wall 13 may be secured along their edges to these frames by suitable means, such as the screws 16 extending through apertures in the corresponding walls and threaded into the frame.

An axle 17 is journaled in the body adjacent the rear end of the latter and extends transversely of the body with its axis of rotation substantially at the center of curvature of the rear end of the body and chain sprockets, one of which is illustrated in Figures 1 and 3 and indicated at 18, are mounted on the axle 17, one at each end thereof, and disposed at the outer sides of the side walls 11 and 12, respectively. The body frames 14 are recessed or rabbeted out along their outer corners, as indicated at 19 in Figure 4, and rails of circular cross sectional shape, as indicated at 20 in Figures 4 and 5, extend around the frame in the recesses 19 and are rigidly secured to the frames by suitable means, such as the screws 21.

The ends of the rails 20 terminate adjacent the corresponding chain sprockets 18 and link chains 22 and 23 are trained one around each rail and around the corresponding chain sprocket. Cleats 24 extend perpendicularly between the chains at uniformly spaced apart locations therealong and are secured at their ends to the chains, so that the cleats and the chains together constitute an endless track trained around the body 10 and extending over the top, bottom and curved end surfaces of the body.

The chains 22 and 23 are link-roller chains of known construction and have special links, as indicated at 25, at spaced apart locations therealong for connecting the cleats to the chain. Each special link provides an apertured lug projecting outwardly from the associated link and each cleat 24 comprises a core 26 in the form of a rod having screw threaded ends of reduced diameter extending through apertures in the lugs of the corresponding special links 25 and receiving nuts 27 which secure the rod at its opposite ends to the corresponding special links 25 of the chains 22 and 23. A sleeve 28 of resilient material receives the rod 26 between the chains and these sleeves provide resilient treads for the endless track. The sleeves 28 may be formed of lengths of suitable material, such as pressure type rubber hose.

An engine, generally indicated at 30, is mounted in the body 10 on a suitable engine supporting frame 31, and is drivingly connected to the axle 17 through a clutch 32, a change speed transmission 33, a drive shaft 34 and intermeshing beveled gears 35 and 36 mounted on the drive shaft 34 and the axle 17 respectively. The clutch is controlled by a foot pedal 37 disposed adjacent the outer side of the side wall 11 of the body and connected to the engine clutch by suitable linkage extending through an opening 38 in the side wall, the change speed transmission is controlled by a gear shift lever 39 mounted on the side wall 11 and disposed adjacent the outer side thereof and the engine throttle is controlled by a throttle lever 40 connected to the throttle by suitable means, such as the flexible push and pull connecting member 41. The engine is provided with a fuel tank having a filler spout 42 extending through the side wall 11, and the side walls are provided with air inlet and outlet louvers, as indicated at 43 and 44, for the passage of cooling air past the engine 30.

With this arrangement, the engine 30 is effective to drive the chain sprockets and cause the endless track to move around the body 10, the track being driven in a direction such that it moves longitudinally of the bottom surface of the body from the front end to the rear end thereof and returns from the rear end to the front end of the body along the upper or top surface of the latter. The track, when driven by the engine, will thus propel the body forwardly across snow.

A hollow shield 45, preferably formed of sheet metal, encloses the top portion of the body and the upper portion of the endless track and extends from the rear to the front end of the body. This shield is secured along its edges to the body by suitable means, such as the screws 46 extending through the sides of the shield and the side walls of the body and a rider's seat 47, in the form of a side and clear of said track, and steering means for said snowmobile comprising skis disposed one at each side of said body and extending longitudinally thereof, bearing collars mounted in said cover and having a common axis extending transversely of said cover above the upper side of said body, struts disposed one at each side of said body and each connected at its upper end to the corresponding bearing collar for swinging movements about the common axis of said bearing collars, each of said skis being pivotally mounted about a vertical axis to the lower end of the associated strut, a bar extending through said bearing collars, a steering shaft mounted on said cover and connected to said bar for imparting longitudinal movements to said bar upon manual rotation of said steering shaft, means connecting said skis to the corresponding ends of said bar and imparting steering movements to said skis in response to longitudinal movements of said bar, said skis being movable rearwardly and upwardly to pass over obstructions in their paths, and footrests mounted one on each of said struts.

3. A snowmobile comprising an elongated body having a top side, a bottom side and side walls, rails extending around said body one adjacent each of said side walls, a power driven endless track having a width substantially as great as the width of said body guided on said rails and extending around said body and along said top and bottom sides for propelling the snowmobile, a cover mounted on said body and disposed above the top side of the body clear of said endless track, a transversely disposed bar carried by said cover, struts disposed one at each side of said body and each connected at its upper end to said bar for swinging movement about said bar as an axis, steering means for said snowmobile comprising skis disposed one at each side of said body and extending longitudinally thereof, each of said skis being pivotally mounted about a vertical axis to the lower end of the associated strut, a steering shaft connected to said bar for imparting longitudinal movements to said bar upon manual rotation of said steering shaft, and means connecting said skis to the corresponding ends of said bar and imparting steering movements to said skis in response to longitudinal movements of said bar.

References Cited in the file of this patent

UNITED STATES PATENTS

| | | |
|---|---|---|
| 2,196,458 | Flynn et al. | Apr. 9, 1940 |
| 2,317,048 | Fosbak | Apr. 20, 1943 |
| 2,341,000 | Tucker et al. | Feb. 8, 1944 |
| 2,346,351 | Bombardier | Apr. 11, 1944 |
| 2,378,111 | Tucker et al. | June 12, 1945 |
| 2,393,309 | Cochran | Jan. 22, 1946 |
| 2,561,716 | Tucker | July 24, 1951 |
| 2,617,659 | Grenier | Nov. 11, 1952 |

FOREIGN PATENTS

| | | |
|---|---|---|
| 118,365 | Switzerland | Jan. 3, 1927 |
| 866,523 | France | May 19, 1941 |